United States Patent [19]

Cheng et al.

[11] Patent Number: 5,956,727
[45] Date of Patent: Sep. 21, 1999

[54] HETEROGENEOUS DATABASE SYSTEM WITH DATA SOURCE EXTENSIBILITY AND ALTERATION OF DATABASE FUNCTIONS

[75] Inventors: Tu-An Cheng, Cupertino; James Charles Kleewein, San Jose; Eileen Tien Lin, San Jose; Tina Louise Mukai, San Jose; Yun Wang, Saratoga; Steven John Watts, Morgan Hill, all of Calif.

[73] Assignee: International Business Machines Corporation, Armonk, N.Y.

[21] Appl. No.: 08/929,809

[22] Filed: Sep. 15, 1997

[51] Int. Cl.⁶ .................................................. G06F 17/30
[52] U.S. Cl. ............................... 707/102; 707/3; 707/10; 707/104
[58] Field of Search ................... 707/1, 2, 3–5, 707/10, 100, 101, 102, 8, 103, 104; 395/500, 200.35

[56] References Cited

U.S. PATENT DOCUMENTS

| | | | |
|---|---|---|---|
| 5,291,583 | 3/1994 | Bapat ..................................... | 395/500 |
| 5,297,279 | 3/1994 | Bannon et al. ......................... | 707/103 |
| 5,325,523 | 6/1994 | Beglin et al. .......................... | 707/200 |
| 5,437,027 | 7/1995 | Bannon et al. ......................... | 707/103 |
| 5,469,560 | 11/1995 | Beglin .................................... | 711/112 |
| 5,511,186 | 4/1996 | Carhart et al. ............................ | 707/2 |
| 5,546,577 | 8/1996 | Marlin et al. ........................... | 707/103 |
| 5,561,797 | 10/1996 | Gilles et al. ............................... | 707/8 |
| 5,566,329 | 10/1996 | Gainer et al. .............................. | 707/4 |
| 5,572,555 | 11/1996 | Soenen et al. .......................... | 375/364 |
| 5,590,321 | 12/1996 | Lin et al. ................................ | 707/10 |
| 5,596,744 | 1/1997 | Dao et al. ............................... | 707/10 |
| 5,634,053 | 5/1997 | Noble et al. .............................. | 707/4 |
| 5,682,535 | 10/1997 | Knudsen ................................ | 395/701 |
| 5,721,904 | 2/1998 | Ito et al. ................................... | 707/8 |
| 5,764,949 | 6/1998 | Huang et al. ........................... | 395/500 |

OTHER PUBLICATIONS

IBM Technical Disclosure Bulletin, vol. 36–No. 11, Nov. 1993, pp. 363–366, "Dynamic Ordering of Joined Rows Using Fields from Multiple Tables".

IBM Technical Disclosure Bulletin, vol. 31, No. 5, Oct. 1988, pp. 301–303, "Interpretive Database Merge Join Operation".

David M Hansen et al., using an object oriented database to encapsulate heterogeneous scientific data sources, IEEE 1994, and 408–417, Jan. 1994.

Anthony Tomasic et al., scaling heterogeneous databases and the design of disco, IEEE 1996, and 449–457, May 1996.

*Primary Examiner*—Wayne Amsbury
*Assistant Examiner*—Srirama Channavajjala
*Attorney, Agent, or Firm*—Ohlandt, Greeley, Ruggiero & Perle

[57] ABSTRACT

A heterogeneous database system is described which includes plural database systems, one of the database systems acting as an interface (i.e., system manager). The system manager performs functions which provide an application program with transparent access to the entire database system. The system manager includes a memory for storing (i) a matrix of functional capabilities of each of the plural databases, (ii) a catalog of functions that are supportable by various databases and (iii) and entry matrix for providing an interface function between a user and the system manager. A processor is present in the system manager; and is responsive to a user entry, via the entry matrix, with respect to a functional capability of one of the plural databases, to alter a matrix of functional capabilities pertaining to the database. The alteration is carried out in accordance with a corresponding functional capability entry in the catalog. If a user entry is received which refers to a database for which no entry exists in the matrix of functional capabilities, the system manager presents an entry matrix in a form which reflects default functional capabilities. Thereafter, the default capabilities may be altered by a system administrator to reflect the capabilities of the new database.

12 Claims, 2 Drawing Sheets

HETEROGENEOUS DATABASE SYSTEM WITH DATA SOURCE EXTENSIBILITY AND ALTERATION OF DATABASE FUNCTIONS

CROSS-REFERENCE TO RELATED PATENT APPLICATIONS

This Application is related to the following co-pending patent applications:

"SYSTEM AND METHOD FOR PROVIDING A SINGLE APPLICATION PROGRAM INTERFACE FOR HETEROGENEOUS DATABASES", Inventor(s): Kleewein et al., U.S. Ser. No. 08/931,008, now pending;

"METHOD AN APPARATUS FOR OPTIMIZING QUERIES ACROSS HETEROGENEOUS DATA BASES", Inventor(s): Kleewein et al., U.S. Ser. No. 08/929,877, now pending;

"METHOD AND APPARATUS FOR OPTIMIZING A MERGE-JOIN OPERATION ACROSS HETEROGENEOUS DATABASES", Inventor(s): Kleewein et al., U.S. Ser. No. 08/931,404, now pending;

"METHOD AND APPARATUS FOR CACHING RESULT SETS FROM QUERIES TO A REMOTE DATABASE IN A HETEROGENEOUS DATABASE SYSTEM", Inventor(s): Kleewein et al., U.S. Ser. No. 08/931,003, now pending;

"METHOD AND APPARATUS FOR DEFERRING LARGE OBJECT RETRIEVALS FROM A REMOTE DATABASE IN A HETEROGENEOUS DATABASE SYSTEM", Inventor(s): Kleewein et al., U.S. Ser. No. 08/929,642, now pending;

"HETEROGENEOUS DATABASE SYSTEM WITH DYNAMIC COMMIT PROCEDURE CONTROL", Inventor(s): Kleewein et al., U.S. Ser. No. 08/931,029, now pending; and "METHOD AND APPARATUS FOR ACCESSING OF LARGE OBJECT DATA SEGMENTS FROM A REMOTE DATABASE", Inventor(s): Maheshwari et al., U.S. Ser. No. 08/931,002, now pending.

FIELD OF THE INVENTION

This invention relates to an application program interface which provides transparent access to heterogeneous databases and, more particularly, to such an interface which enables ready updating of connected heterogeneous database functions and capabilities.

BACKGROUND OF THE INVENTION

Many organizations have plural sites where databases are maintained, each with a different operating system and database structure. A continuing demand exists to join together such multiple databases so as to enable transparent access to data contained therein. "Transparent" implies that an application program at a specific site is able to access data from all connected databases, without being aware of the origin of the data, nor of any incompatibilities which might exist between a local database and any of the plurality of coupled remote databases. It is to be understood that the terms "remote" and "local" not only refer to physical locations, but also to databases that are located at a single site, but are controlled by different operating systems or database protocols.

In order to provide a transparent interface for heterogeneous databases, the prior art has employed one database as an interface and has enabled that interface, under control of a database management system (DBMS), to access data from other databases in accordance with data entries contained in an interface table. In such prior art systems, the interface table was hard-coded (i.e., not available for alteration by the user) and provided information which enabled the interface database to access and handle data from other coupled databases. Because the interface table was hard-coded, any change to a coupled heterogeneous database (e.g., datatype format, function availability, data semantics, etc.) created a compatibility problem that could only be overcome by revision of the hard-coded table or by a software revision which would override the hard-coded version. The former solution is expensive and the latter solution adds to the processing time of the database system and is therefore unsatisfactory. The compatibility problem becomes even more severe when a new database is added to the system that is unknown to the interface database.

A number of prior art patents teach methods for enabling transparent access to heterogeneous databases. For instance, U.S. Pat. No. 5,560,005 to Hoover et al. describes an object-based, relational, distributed database system wherein each of a plurality of remotely located user computers includes a heterogeneous data structure. Data at such locations are "homogenized" by mapping predetermined data field items stored in the heterogeneous databases to corresponding object attributes associated with a predetermined instance of an object. The system stores location information and status information relating to the homogenized data in a centralized "object broker" processor for object management. This action facilitates location and retrieval of data items from the remote heterogeneous databases.

U.S. Pat. No. 5,604,892 to Nuttall et al. describes an alterable information model that is usable in accordance with various electric power system arrangements. An object-oriented information model provides a generic power system model that may be applied to any of several applications. Physical equipments are represented as objects, with attributes that can be verified and relations including connectivity, grouping and location.

U.S. Pat. No. 5,600,831 to Levy et al. describes techniques for optimizing queries from a number of different databases that are accessible via a network. A query plan is generated which includes subplans for querying databases which include the requested information. When a subplan is executed in one of the databases, the database returns not only the information which results from the execution of the subplan but also source and constraint information about the data in the database. The source and constraint information is then used to optimize the query plan by pruning redundant subplans. In one embodiment, a domain model is used which includes a world view of the data, a set of descriptions of the databases and a set of descriptions of how to access the data. The information in the domain model is used to formulate the query plan.

While the above prior art indicates the use of tables to enable transparent access between heterogeneous databases, there is a need for improved methods and systems which accommodate newly added databases and altered database functions, datatypes, etc.

Accordingly, it is an object of this invention to provide a heterogeneous database system with a method and apparatus that enables ready accommodation of changes to existing database structures.

It is another object of this invention to provide an improved heterogeneous database system, wherein additional databases, previously unknown, can be added to the heterogeneous system and transparency retained.

SUMMARY OF THE INVENTION

A heterogeneous database system is described which includes plural database systems, with one of the database systems acting as an interface (i.e., system manager). The system manager performs functions which provide an application program with transparent access to the entire database system. The system manager includes a memory for storing (i) a matrix of functional capabilities of each of the plural databases, (ii) a catalog of functions that are supportable by various databases and (iii) an entry matrix for providing an interface function between a user and the system manager. A processor is present in the system manager and is responsive to a user entry, via the entry matrix, with respect to a functional capability of one of the plural databases, to alter a matrix of functional capabilities pertaining to the database. The alteration is carried out in accord with a corresponding functional capability entry in the catalog. If a user entry is received which refers to a database for which no entry exists in the matrix of functional capabilities, the system manager presents an entry matrix in a form which reflects default functional capabilities. Thereafter, the default capabilities may be altered by a system administrator to reflect the capabilities of the new database.

DETAILED DESCRIPTION OF THE INVENTION

Figure 1:
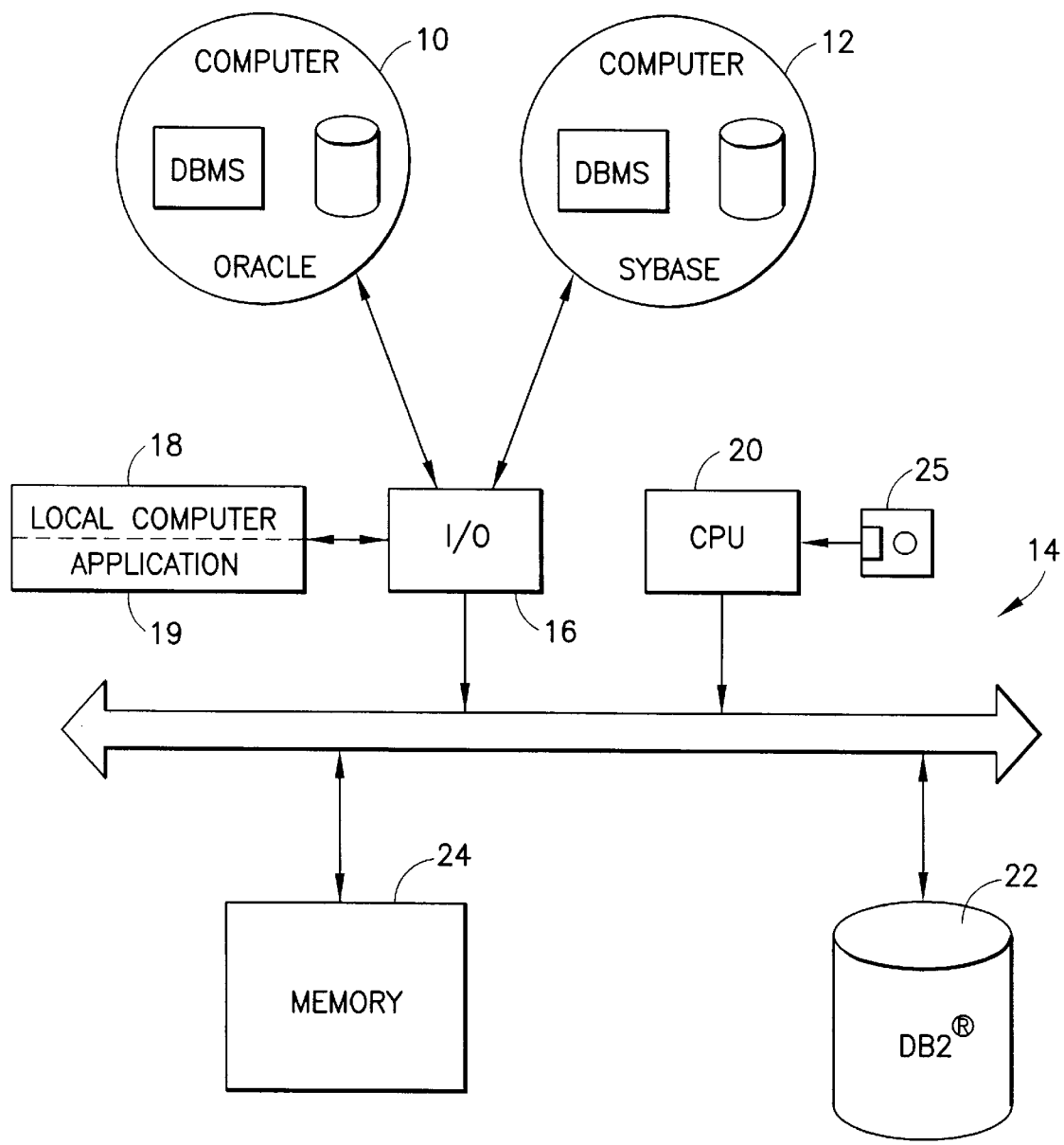
FIG. 1 is a high level block diagram of a heterogeneous database system which incorporates the invention.

Referring to FIG. 1, a heterogeneous database system includes, for example, three separate database management systems (DBMS's). A computer 10 includes an Oracle DBMS, a computer 12 includes a Sybase DBMS, and a computer/server 14 includes an IBM DB2® DBMS. (Oracle is a trademark of the Oracle Corporation, Sybase is a trademark of the Sybase Corporation, IBM and DB2 are registered trademarks of the International Business Machines Corporation). Computer/server 14 includes an input/output (I/O) module 16 which enables communication with computers 10 and 12 and various local computers 18, etc.

As will be hereafter understood, an application program 19 running on local computer 18 is able to access data from any connected database, whether the data is housed in computers 10, 12 or 14, and at all times it appears to application program 19 as though the data is coming from computer/server 14. A central processing unit (CPU) 20, a disk file 22 where the data comprising the DB2 database is stored and a memory 24 are all contained within computer/server 14. Within memory 24 are a plurality of procedures which provide overall control of the DB2 database and enable transparent access to and from the Oracle and Sybase databases in computers 10 and 12. Each of the aforesaid databases can be accessed by a standard data access language such as SQL (structured query language). SQL functions as a standard interface language which substantially all databases can understand and respond to.

Figure 2:
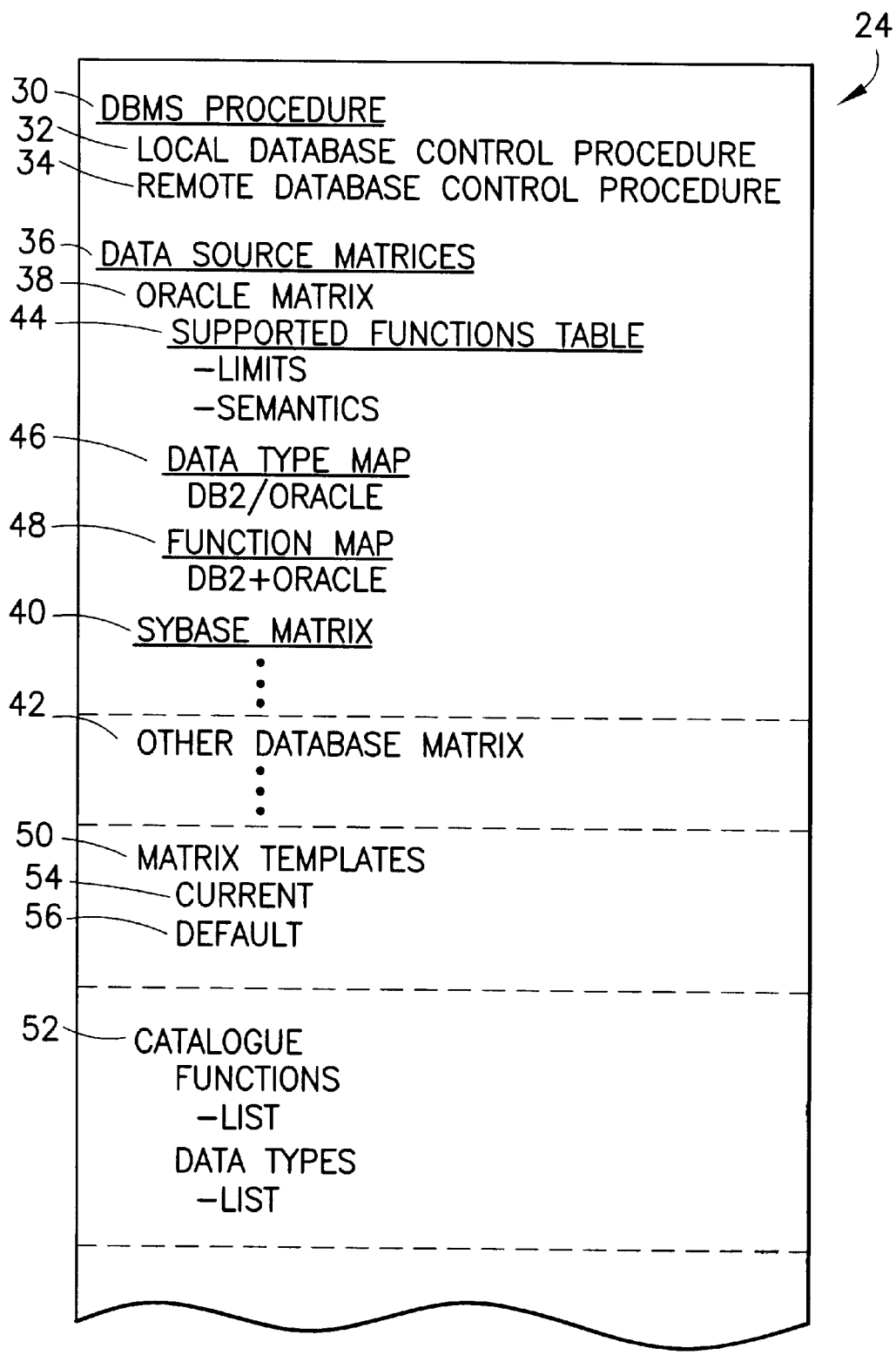
FIG. 2 is a schematic diagram of data contained within memory in the system of FIG. 1 which enables operation of the invention.

While the procedures to be considered below which enable implementation of the invention are shown in FIG. 2 as already loaded into memory 24, it is to be understood those procedures can be loaded into CPU 20 via a memory disk, tape or other storage device 25 in the well known manner. In any of these cases, the operation of CPU 20, in carrying out the functions of the invention, are controlled by the procedures and data stored in either memory 24 or storage device 25.

FIG. 2 is a diagram which schematically illustrates some of the entries stored in memory 24 of FIG. 1. DBMS procedure 30 includes local database control procedure 32 and remote database control procedure 34. Local database control procedure 32 is, for instance, responsive to a request from application program 19 running on local computer 18, to retrieve requested data from the DB2 database stored in disk file 22. Remote database control procedure 34 performs the same function, but with respect to the Oracle and Sybase databases contained within computers 10 and 12. In all cases, the functioning of procedures 32 and 34 are transparent to application program 19.

To enable remote database control procedure 34 to operate on a transparent basis, a plurality of data source matrices 36 are included in memory 24. Each data source matrix provides information required by remote database access procedure 34 to enable access to a corresponding remote database and the handling of data therefrom. More specifically, data source matrices 36 includes an Oracle matrix 38 for the Oracle database in computer 10, a Sybase matrix 40 for the Sybase database in computer 12 and additional matrices (e.g., 42) for any other database types that are coupled to processor/server 14.

Oracle matrix 38, for example, includes a support function table 44 which defines each function that is performable by the Oracle database, any limits with respect thereto, and semantic requirements needed to accommodate the functions. For example, such supported functions may be various "join" actions, aggregate actions, retrieval actions using "like", "null", subqueries, etc. For each supported function, table 44 includes an indication as to whether there is a limit on the number of entries which can be accommodated by the function, e.g., if the function is a "group by" action, there may be a limit on the number of list items which can be accommodated by the "group by" action. Further, if there are any semantics discrepancies between the Oracle database and the local database, such semantics discrepancies are indicated.

Also included in Oracle matrix 38 is a datatype map 46 and a function map 48. Datatype map 46 maps which local DB2 datatypes map to Oracle database datatypes. Similarly, function map 48 maps which function of the Oracle database map to equivalent functions on the local, DB2 database.

Sybase matrix 40 contains similar entries to those included in Oracle matrix 38, but manifests information regarding functions that are supported by the Sybase DBMS. Such individual capability matrices enable remote database control procedure 34 to interact with each known database type and to communicate therewith on a transparent basis. When, however, the system administrator at computer/server 14 determines that there has been a change in one of the remote database systems or that a new database has been introduced which may be added to the heterogeneous database system, the system administrator makes use of a matrix template 50 and a catalog 52 to modify data source matrices 36 to accommodate either database changes or the addition of one or more new database systems.

Catalog 52 incorporates an extensive set of function entries that define most known functions that are supported by currently available databases, along with indications of limits, semantics, and any other information necessary to implement such functions. Further, catalog 52 incorporates a listing of datatypes which may be utilized in establishing a datatype map entry.

Matrix template 50 includes two versions, a current version 54 and a default version 56. Each matrix template 50 is essentially a displayable screen which indicates the entries in a data source matrix 36. When current matrix template 54 is displayed, it includes all entries that are currently present in the respective matrix being considered (e.g., Oracle matrix 38). By contrast, default matrix template 56, if accessed by the system administrator, displays a series of default entries of functions, datatypes, etc., which are currently found in commonly available databases.

The use of matrix templates 50 and catalog 52 will become apparent from the following examples. Assume first that the system administrator becomes aware of a change in a supported function in the Oracle database. Under such circumstances, the system administrator invokes remote database control procedure 34 which then enables a display of current matrix template 54. The displayed matrix template 54 includes entries currently in Oracle matrix 38. Once displayed, remote database control procedure 34 enables alteration, by the system administrator, of the data entered in Oracle matrix 38.

To implement such an alteration, the system administrator refers to catalog 52 and accesses therefrom an entry which reflects the alteration which has been implemented by the Oracle DBMS. For instance, if a previously non-supported function is added to the Oracle DBMS by the manufacturer, the system administrator accesses from catalog 52, an entry corresponding to the function now supported by Oracle and causes that entry to be inserted into Oracle matrix 38 as an added function within supported function table 44. Similar action can be taken with respect to datatypes or other entries in Oracle matrix 38. Thereafter, when remote database control procedure 34 accesses supported function table 44, in response to an application program request, it will find the newly listed function and is able to utilize it in regards to data transactions from the Oracle database.

If it is now assumed that an entirely new database type has been introduced, which is either to be added to the heterogeneous database system or is contemplated as being added at some time in the future, the database administrator, via remote database control procedure 34, accesses default matrix template 56. That template, upon being displayed, illustrates a matrix for a default database and denotes functions, etc. that are currently supported by most databases. Thereafter, the database administrator is enabled to alter default matrix template 56 in accordance with the published specifications of the new database.

Alterations of the default matrix template 56 are accomplished by accessing catalog 52 and adding or replacing functions, datatypes, etc. listed therein which are specified as being supported by the new database. Thereafter, remote database control procedure 34 enables the creation of a new matrix within data source matrices 36 to hold the contents of the default matrix template. Further, once the default matrix template data is entered in the new matrix position, it may be renamed in accordance with the new database type.

As a result of the provision of matrix templates 50 and catalog 52, the database administrator is enabled to "tune" the database system to accommodate both changes in supported functions and newly added database structures.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A heterogeneous database system including plural databases, one of said databases acting as a system manager (hereafter "system manager") which performs functions to provide a transparent user database, said system manager comprising:

a memory for storing (i) a catalogue of functions that are supportable by various databases, and (ii) an entry matrix for providing an interface function between a user and said system manager; and a processor coupled to said memory for enabling selective alterations to or additions of individual functions, via an interface template, and responsive to a user entry into said interface template which displays data included in said entry matrix with respect to a functional capability of one of said plural databases, to create or alter an existing matrix of functional capabilities pertaining to said one of said plural databases in accordance with a corresponding functional capability in said catalogue.

2. The heterogeneous database system as recited in claim 1, wherein said processor responds to a user entry by presenting said entry matrix to said user in a template form which reflects functional capabilities for said one of said plural databases currently entered in said matrix of functional capabilities.

3. The heterogeneous database system as recited in claim 1, wherein said processor responds to a user entry which refers to a database for which no entry exists in said matrix of functional capabilities, by presenting said entry matrix to said user in a template form which reflects default functional capabilities.

4. The heterogeneous database system as recited in claim 1, wherein said processor responds to a data read/write request from a user processor, by employing data from said matrix of functional capabilities to access data from one of said plural databases and to present said data to said user processor as though said data had come from said system manager, whether or not said data came from said system manager or another database.

5. A memory media including software procedures to provide transparent access to plural heterogeneous databases, one of said databases acting as a system manager (hereafter "system manager") which performs functions of a transparent user database, said memory media comprising:

a) means for causing said system manager to store (i) a catalogue of functions that are supportable by various databases, and (ii) an entry matrix for providing an interface function between a user and said system manager, said interface function enabling display of a template that enables said user to alter or add individual functions associated with said various databases; and b) means for controlling a processor in said system manager to be responsive to a user entry into said interface template which displays data included in said entry matrix with respect to a functional capability of one of said plural databases, to create or alter a matrix of functional capabilities pertaining to said one of said plural databases in accordance with a corresponding functional capability in said catalogue.

6. The memory media as recited in claim 5, wherein said means b) causes said processor to respond to a user entry by presenting said entry matrix to said user in said template form which reflects functional capabilities for said one of said plural databases currently entered in said matrix of functional capabilities.

7. The memory media as recited in claim 5, wherein said means b) causes said processor to responds to a user entry which refers to a database for which no entry exists in said matrix of functional capabilities, by presenting said entry matrix to said user in said template form which reflects default functional capabilities.

8. The memory media as recited in claim 5, further comprising:

c) means for controlling said processor to respond to a data read/write request from a user processor, by employing data from said matrix of functional capabilities to access data from one of said plural databases and to present said data to said user processor as though said data had come from said system manager, whether or not said data came from said system manager or another database.

9. A method for providing transparent access to plural heterogeneous databases, one of said databases acting as a system manager (hereafter "system manager") which performs functions of a transparent user database, said method implemented by said system manager and comprising the steps of:

a) storing (i) a catalogue of functions that are supportable by various databases, and (ii) an entry matrix for providing an interface function between a user and said system manager, said interface function enabling display of a template that enables said user to alter or add individual functions associated with said various databases; and b) responding to a user entry into said interface template, through use of data included in said entry matrix pertaining to a functional capability of one of said plural databases, by creating or altering an existing matrix of functional capabilities pertaining to said one of said plural databases in accordance with a corresponding functional capability in said catalogue.

10. The method as recited in claim 9, wherein step b) causes said processor to respond to a user entry by presenting said entry matrix to said user in said template form which reflects functional capabilities for said one of said plural databases currently entered in said matrix of functional capabilities.

11. The method as recited in claim 9, wherein step b) causes said processor to respond to a user entry which refers to a database for which no entry exists in said matrix of functional capabilities, by presenting said entry matrix to said user in said template form which reflects default functional capabilities.

12. The method as recited in claim 9, further comprising the step of:

c) responding to a data read/write request from a user processor, by employing data from said matrix of functional capabilities to access data from one of said plural databases and presenting said data to said user processor as though said data had come from said system manager, whether or not said data came from said system manager or another database.

* * * * *